United States Patent [19]

Volkert

[11] Patent Number: 5,375,895
[45] Date of Patent: Dec. 27, 1994

[54] VACUUM SUCTION LIFTER

[75] Inventor: Thomas Volkert, Appenheim, Germany

[73] Assignee: Schott Glaswerke, Mainz, Germany

[21] Appl. No.: 20,536

[22] Filed: Feb. 22, 1993

[30] Foreign Application Priority Data

Feb. 25, 1992 [DE] Germany ............... 4205628

[51] Int. Cl.⁵ ............................................. B66C 1/02
[52] U.S. Cl. ................................. 294/64.1; 294/902
[58] Field of Search ......................... 294/64.1–65, 294/902; 901/40; 414/627, 737

[56] References Cited

U.S. PATENT DOCUMENTS

| | | | |
|---|---|---|---|
| 3,627,369 | 12/1971 | Nixon | 294/64.1 |
| 3,910,620 | 10/1975 | Sperry | 294/64 |
| 4,023,845 | 5/1977 | Schnebly | |
| 4,342,803 | 8/1982 | Stengle, Jr. | |
| 4,357,156 | 11/1982 | Seymour | |
| 4,505,505 | 3/1985 | Senaratne | 294/64.1 |
| 4,511,386 | 4/1985 | Kellar et al. | 294/64.1 X |
| 4,707,012 | 11/1987 | Takagi | 294/64.1 |
| 4,923,363 | 5/1990 | DiFrank | |
| 5,203,905 | 4/1993 | Kuster et al. | |

FOREIGN PATENT DOCUMENTS

| | | | |
|---|---|---|---|
| 0484238 | 5/1992 | European Pat. Off. | |
| 2345057 | 10/1977 | France | 294/64.1 |
| 1276310 | 8/1968 | Germany | 294/64.1 |
| 2516189 | 10/1975 | Germany | |
| 4034600 | 2/1992 | Germany | |
| 7800379 | 7/1978 | Netherlands | 294/64.1 |
| 1449786 | 9/1976 | United Kingdom | |
| 1526933 | 10/1978 | United Kingdom | |
| 2249079 | 4/1992 | United Kingdom | 294/64.1 |

Primary Examiner—Dean J. Kramer
Attorney, Agent, or Firm—Michael D. Bednarek

[57] ABSTRACT

A vacuum suction lifter for holding and transferring objects with a temperature of more than 400° C., in particular glass screens, is provided, the contact surface (4) of which is raised with respect to a central surface (6), and which is covered with a heat-resistant, sufficiently tight textile structure of poor thermal conductivity, preferably a glass fibre fabric, as the sealing element (16). The contact surface (4) matches the contour of the workpiece to be lifted.

18 Claims, 1 Drawing Sheet

VACUUM SUCTION LIFTER

FIELD OF THE INVENTION

The invention relates to a vacuum suction lifter for holding and transferring workpieces with temperatures of 400° C., in particular workpieces of glass having a curved surface, with a base which has a working side facing the workpiece and, adjacent thereto, a rear region which is provided with means for fixing to a device and with a vacuum connection, and with a sealing element of a heat-resistant material of poor thermal conductivity located on the working side of the base.

BACKGROUND OF THE INVENTION

Hot workpieces, for example of glass, with a temperature of 400°–450° C. or more must be fed to various processing devices and positioned on these processing devices in the course of production. In addition to conveyer belts, vacuum suction lifters above all are an essential constituent of the conveyer chain. These vacuum suction lifters operate under a vacuum of 0.3–0.5 bar and are attached to handling and transferring equipment, for example industrial robots, which can perform movements in three dimensions.

Suction lifters having a sealing element of asbestos are known, in which an asbestos tape is wound in several layers onto a cylindrical part of a metallic base such that the asbestos tape projects considerably beyond the front face of the cylindrical base, so that the asbestos coil forms, in its region projecting beyond the end of the base, a cylindrical hollow body, the interior of which forms the vacuum space of the suction unit. The sealing surface with respect to the workpiece to be handled is the front face of the asbestos coil. Because of its relatively large projection beyond the base and its property of yielding within certain limits, the asbestos coil is capable of matching the external contour of the workpiece to be handled to form a seal, especially if workpieces of the same type are constantly being handled with the suction lifter. If necessary, the front face of the asbestos coil can also be matched to the contour of the implements to be handled beforehand.

Suction lifters having the construction described above are relatively small in structure from the diameter point of view and can therefore advantageously also be employed where room for movement is limited.

Suction lifters for elevated temperatures are also known, in which a base of metal is surrounded by a plate-shaped or cuplike spring metal sheet which extends into a two-layer ring, closed on the outer circumference, of a heat-resistant fabric, for example a glass fibre fabric, forming a cup-like, flexible sealing lip such as is known, for example, from rubber suction units. To achieve adequate sealing when using such a heat resistant fabric material and the relatively high holding forces required, the flexible sealing lips must be relatively wide, resulting in large diameters for the suction head, so that it often can no longer be used where room for movement is limited.

Sealing lip suction units furthermore have the disadvantage that on flexible application of the sealing lips, relative movements occur on the surface of the workpiece, leading to shearing forces in the sealing lip covering and premature wear thereof.

SUMMARY OF THE INVENTION

The invention is therefore based on the object of providing a vacuum suction lifter which can be kept relatively small in construction diameter, but on the other hand renders the use of asbestos dispensable.

This object is achieved according to the invention by a suction lifter, the base of which has, on the working side, a rigid flange in the shape of a cylindrical tube, the inner surface of which forms the boundary a vacuum space connected to the vacuum connection, the front face of the flange facing the workpiece being constructed as a contact surface which is closed to form a ring, the inclination and curvature of the outer contour of which matches the workpiece to be held, and the sealing element comprising at least one layer of a textile structure based on inorganic fibers, with which the contact surface of the base is covered.

A fabric based on glass fibers is preferably employed as the textile structure. It should be mentioned that at least those glass fibre fabrics which have a sufficient degree of fineness for adequate sealing are flexible or limp such that they cannot be processed for suction lifters in a manner described above for the asbestos suction unit, because the fabric would already become brittle after a short period of use.

On the other hand, it has been found, surprisingly, that already one layer, for example of a suitable glass fibre fabric, on a metallic substrate produces an adequate vacuum seal if this metallic substrate matches to a certain extent, if necessary, the contour of the workpiece to be handled. In the context of appropriate constructional dimensions for the ring-shaped contact surface, an adequate transverse seal is achieved parallel to the contact surface. By covering the contact surface several times, improved thermal insulation with respect to the metallic base of the suction unit is achieved, and further functioning is then also still guaranteed if the outer covering of the textile structure should already be damaged.

In this connection, that side of the base which faces the workpiece during holding and transfer is designated the working side. The working side has a usually circular contact surface for the sealing element. The contact surface forms the outer limit of the vacuum space on the working side of the suction lifter, and thus encloses a central surface which is set back.

Between the working side and the rear region of the base, which has fixing elements and a vacuum line, a circumferential ring surface which essentially serves to fix the sealing element can extend in the axial direction of the base. The sealing element is made of a material of high heat resistance and poor thermal conductivity, which matches the surface of the workpiece so that this is not damaged.

Materials which are sufficiently vacuum-tight and have a low thermal conductivity are numerous. However, only few materials fulfil the extremely high requirements of heat stability (operating temperature of 400° C. and more).

Since glass fibers in particular, but also ceramic fibers, such as silicate fibers, do not have a high crushing and shear resistance, which is an essential precondition, however, for a sealing element of the known suction lifters, a vacuum suction lifter was developed, the working side of which is constructed such that the contact surface is raised with respect to the central surface. The covering of heat-resistant material of poor thermal conductivity is then drawn onto the contact surface such that the surface of the textile structure rests on the contact surface. This arrangement of the covering results in neither crushing nor shearing forces which would lead to an extremely high wear, given the low intrinsic strength of the textile structure. The pressure forces which occur due to the vacuum suction lifter being pressed onto the workpiece are also absorbed by a brittle material without problems. All sheet-like structures are designated textile structures here, regardless of whether they are woven or knitted, i.e. regardless of whether the material is a woven fabric, a non-woven or, for example, a felt.

A prerequisite for reliable conveying of the workpiece is that the textile structure at least covers the contact surface of the working side completely.

In a preferred embodiment of the invention, the covering covers the entire working side of the suction lifter. In this embodiment, the covering is attached by being fixed on the one hand to the central surface of the working side, for example by a pressure plate held by means of a screw, and by being clamped and fixed on the other hand on the circumferential ring surface of the vacuum suction lifter, for example by a hose clip or another suitable clamping and fixing device. However, a covering which covers exclusively the contact surface of the vacuum suction lifter is also conceivable. A single-layered covering of the textile structure is in general sufficient to guarantee reliable lifting of the workpiece.

However, it is advantageous to provide at least the contact surface of the working side with several layers of a heat resistant material of poor thermal conductivity to avoid contact between the workpiece and the metallic contact surface of the vacuum suction lifter, especially towards the end of the service life of the covering, when the outer layer of the sealing element no longer has a completely closed cohesiveness. The possibility of the workpiece and the central surface touching, which exists with the known vacuum suction unit with an asbestos coil, is in any case reduced by the lowering of the central surface compared with the pick-up surface, which even withdraws behind the contact surface if it accommodates a fixing device for the covering, in order to guarantee the necessary internal space for build-up of the vacuum.

If several layers of fabric are provided on the contact surface and there is the possibility of choosing between covering materials of higher quality and lower quality, the lower layers can be made from lower quality and therefore usually also cheaper materials, and merely the top layer is then made of a high-quality covering material. Coatings on the covering material, for example silicone coatings resulting from treating the fabric or providing a silicone-containing coating on the back side of the covering material, which gives the textile structure a certain rigidity, do not reduce the use properties of the textile structure, provided that no undesirable side reactions (evolution of gas, encrustations) occur.

A vacuum suction lifter having a covering applied over the surface according to the invention has a service life of about 20 days, compared with a service life of a vacuum suction lifter wound with asbestos of about 6 days.

The vacuum suction lifter with the covering applied according to the invention moreover is also particularly suitable for handling cold workpieces, in contrast to a vacuum suction lifter wound with asbestos.

The contact surface of the base matches, if necessary, the contours of the workpiece to be conveyed, so that reliable lifting and conveying or positioning is ensured from the first workpiece onwards.

For example, if the workpiece to be conveyed is an object with a spherical surface, the contact surface is inclined from the outside towards the central surface, in order to correspond to the surface of the workpiece. If the object to be conveyed has a cylindrical surface, the contact surface of the vacuum suction lifter can be curved out from the working side, which is in itself constructed flat, such that it matches the cylindrical contour of the workpiece to be conveyed. It is also easily conceivable that two such adjustments can be made in a superimposed manner. However, if the matching to the contour is not centrally symmetric, the suction lifter is in each case to be brought up to the workpiece in a particular alignment.

Lining with several layers of a covering material offers the advantage that after the top layer has worn, a sudden transition to a hard material which leaves undesirable markings on the surface of the workpieces, or which under certain circumstances even leads to undesirable excessive cooling of the workpieces, is avoided.

DETAILED DESCRIPTION OF THE DRAWINGS

Figure 1:
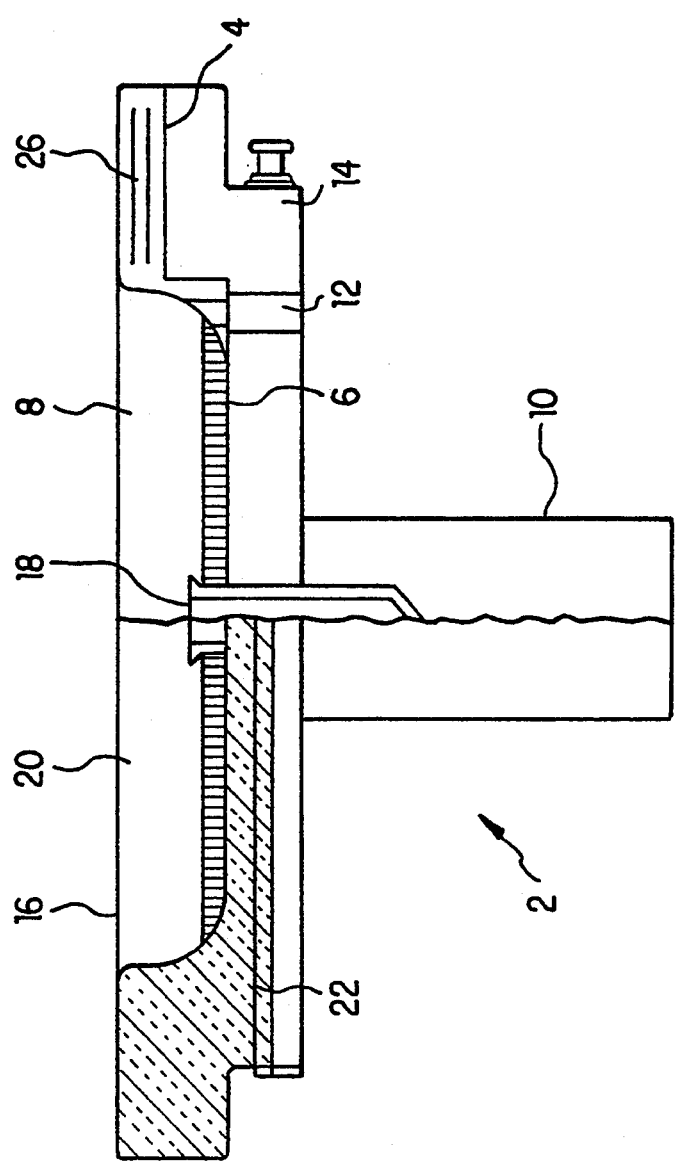
FIG. 1 shows a halfsection through a vacuum suction lifter for holding and transferring a television screen with an essentially spherical surface.

The present invention is illustrated in FIG. 1 and described in more detail below by the example of a vacuum suction lifter having a working side covered over the entire surface.

The vacuum suction lifter first has a base 2, usually of metal, in most cases of steel. The base has a front face or working side with a ring-shaped contact surface 4 and a central surface 6, which is set back with respect to the contact surface 4 and is enclosed by the contact surface 4. The central surface 6 is flat, while the contact surface 4 is inclined 30° from the outer edge towards the central surface, so that it lies better on a television screen with a spherical surface during holding and transfer. The contact surface 4 has a diameter which is larger than the rear region of the base.

The cylindrical hollow space 8 formed by the central surface 6 being set back from the contact surface 4 serves to build up the holding vacuum.

The rear region opposite the working side of the base 2 has a connection 10 for a lifting device and a connection 12 for application of the vacuum.

A ring-shaped circumferential surface 14 extends in the axial direction between the working side and the rear region of the base.

The vacuum suction lifter furthermore has a sealing element 16 in the form of a fabric of glass fibers, for example Isothermtuch-D from Frenzelit.

The sealing element 16 has a circular outline and is located centrally on the working side of the base. It is fixed with a clamping screw 18 and a pressure disc 20, which ensures the sealing element 16 lies against the central surface 6, so that an adequate hollow space 8 remains. The sealing element 16 has an opening in the region of the vacuum connection 12, in order to allow evacuation of the hollow space 8.

The sealing element 16 is clamped tightly over the contact surface 4 by fixing by means of a clamping ring 22 on the circumferential surface 14. After clamping, the glass fibre fabric lies smoothly on the bearing surface 4, so that after the vacuum suction lifter has been placed on the workpiece and the vacuum has been applied, it is ensured that the fabric 16 lies essentially tightly both against the surface of the television screen and against the bearing surface 4. An adequate vacuum can thus be maintained during lifting and transfer.

A crushing and/or shear load on the sealing element 16 is avoided in this embodiment of a vacuum suction lifter, and the service life of the suction lifter is therefore increased considerably.

To increase the life further, circular blanks 26 of a material such as that used for the sealing element 16 are located on the contact surface 4 between the contact surface and sealing element 16. These intermediate layers 26 of material of poor thermal conductivity prevent contact, if the sealing element 16 has already worn in places towards the end of the service life, between the hot television screen and the contact surface 4 of good thermal conductivity, which can lead to undesirable impressions and markings on the glass surface and/or to cracking of the television screen because of too severe local excessive cooling. The circular blanks 26 here can be made either of the same material as the sealing element 16 or of another, for example thinner, or also of cheaper textile fabric.

I claim:

1. A vacuum suction lifter for holding and transferring a hot workpiece having a curved surface, comprising:

a base (2) which has a working side facing the workpiece, a rear region adjacent said working side which is provided with means (10) for fixing to a device, a vacuum connection (12) and a sealing element (16) of a heat-resistant material of poor thermal conductivity located on the working side of the base;

wherein the base (2) has, on the working side, a rigid flange in the shape of a cylindrical tube, an inner surface of which forms a boundary of a vacuum space (8) connected to the vacuum connection, a front face of the rigid flange facing the workpiece being constructed as a rigid contact surface (4) in the form of a ring, an inclination and curvature of an outer contour of said rigid contact surface matching the curved surface of the workpiece to be held, and the sealing element (16) comprising at least one layer of a textile structure having an inorganic fiber base, which engages and lines the rigid contact surface (4) of the base (2).

2. A suction lifter according to claim 1, wherein the textile structure has a glass fiber fabric as the base.

3. A suction lifter according to claim 2, wherein the glass fiber fabric is treated with silicone and/or provided with a silicone-containing coating.

4. A suction lifter according to claim 1, wherein the at least one layer of the textile structure covers the entire working side of the base (2) and outside the contact surface to the rear region of the base (2) and is fixed to it there.

5. A suction lifter according to claim 4, wherein the rear region of the base (2) has a circumferential ring surface (14) which extends essentially in the axial direction of the base and on which the at least one layer of the textile structure is fixed by means of a ring-shaped clamping element (22).

6. A suction lifter according to claim 5, wherein the working side of the base (2) has an outer circumference, and the circumferential ring surface (14) extending essentially in the axial direction is disposed radially inwardly with respect to said outer circumference.

7. A suction lifter according to claim 4, wherein the at least one layer (16) of the textile structure is provided with at least one opening for the vacuum connection in a region within the contact surface (4).

8. A suction lifter according to claim 4, wherein the at least one layer (16) of the textile structure is lined with one or more other layers (26) of a heat-resistant material of poor terminal conductivity.

9. A suction lifter according to claim 8, wherein said other layers (26) of a heat-resistant material of poor thermal conductivity are made of the same textile structure as the at least one layer (16).

10. The suction lifter of claim 1, wherein said sealing element is drawn into the vacuum space such that the sealing element does not contact the workpiece inside the rigid contact surface.

11. The suction lifter of claim 1, wherein said sealing element is mounted such that the sealing element does not contact the workpiece inside the rigid contact surface.

12. The suction lifter of claim 1, further comprising means for preventing relative movement between the sealing element and the rigid contact surface.

13. The suction lifter of claim 12, wherein said means for preventing relative movement comprises means for fixing the sealing element to the base such that the sealing element does not contact the workpiece inside the rigid contact surface.

14. The suction lifter of claim 13, wherein said means for fixing the sealing element comprises means for drawing the sealing element into the vacuum space inside the contact surface and fixing the sealing element to the base.

15. A vacuum suction lifter for holding and transferring a hot workpiece having a curved surface, comprising:

a base (2) which has a working side facing the workpiece, a rear region adjacent said working side which is provided with means (10) for fixing to a device, a vacuum connection (12), and a sealing element (16) of a heat-resistant material of poor thermal conductivity located on the working side of the base;

wherein the base (2) has, on the working side, a rigid flange in the shape of a cylindrical tube, an inner surface of which forms a boundary of a vacuum space (8) connected to the vacuum connection, a front face of the rigid flange facing the workpiece being constructed as a rigid contact surface (4) in the form of a ring, an inclination and curvature of an outer contour of said rigid contact surface matching the curved surface of the workpiece to be held, and the sealing element (16) comprising at least one layer of a textile structure having an inorganic fiber base, with which the rigid contact surface (4) of the base (2) is covered;

wherein the at least one layer of the textile structure covers the entire working side of the base (2) and outside the contact surface to the rear region of the base (2) and is fixed to it there; and wherein the at least one layer (16) of the textile structure is drawn into the vacuum space inside the contact surface (4) and is fixed to the base (2) by means of a clamping element (18, 20) in the form of a pressure disk.

16. A vacuum suction lifter for holding and transferring a hot workpiece having a curved surface, comprising:

a base (2) which has a working side facing the workpiece, a rear region adjacent said working side which is provided with means (10) for fixing to a device, a vacuum connection (12), and a sealing element (16) of a heat-resistant material of poor thermal conductivity located on the working side of the base;

wherein the base (2) has, on the working side, a rigid flange in the shape of a cylindrical tube, an inner surface of which forms a boundary of a vacuum space (8) connected to the vacuum connection, a front face of the rigid flange facing the workpiece being constructed as a rigid contact surface (4) in the form of a ring, an inclination and curvature of an outer contour of said contact surface matching the curved surface of the workpiece to be held, and the sealing element (16) comprising at least one layer of a textile structure having a glass fiber fabric as a base, with which the rigid contact surface (4) of the base (2) is covered; and further wherein the glass fiber fabric is treated with silicone and/or provided with a silicone-containing coating.

17. A vacuum suction lifter for holding and transferring a hot workpiece having a curved surface, comprising:

a base (2) which has a working side facing the workpiece, a rear region adjacent said working side which is provided with means (10) for fixing to a device, a vacuum connection (12), and a sealing element (16) of a heat-resistant material of poor thermal conductivity located on the working side of the base;

wherein the base (2) has, on the working side, a rigid flange in the shape of a cylindrical tube, an inner surface of which forms a boundary of a vacuum space (8) connected to the vacuum connection, a front face of the rigid flange facing the workpiece being constructed as a rigid contact surface (4) in the form of a ring, an inclination and curvature of an outer contour of said contact surface matching the curved surface of the workpiece to be held, and the sealing element (16) comprising at least one layer of a textile structure having an inorganic fiber base, with which the rigid contact surface (4) of the base (2) is covered;

wherein the at least one layer of the textile structure covers the entire working side of the base (2) and outside the contact surface to the rear region of the base (2) and is fixed to it there; and wherein the at least one layer (16) of the textile structure is lined with one or more other layers (26) of a heat-resistant material of poor terminal conductivity.

18. A suction lifter according to claim 17, wherein said other layers (26) of a heat-resistant material of poor thermal conductivity are made of the same textile structure as the at least one layer (16).

* * * * *